(12) United States Patent
Barel et al.

(10) Patent No.: US 10,884,522 B1
(45) Date of Patent: Jan. 5, 2021

(54) ADAPTIVE HOVER OPERATION OF TOUCH INSTRUMENTS

(71) Applicant: Microsoft Technology Licensing, LLC, Redmond, WA (US)

(72) Inventors: Eli Barel, Bosh-HaAyi'n (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/445,609

(22) Filed: Jun. 19, 2019

(51) Int. Cl.
*G06F 3/038* (2013.01)
*G06F 3/0354* (2013.01)
*G06F 3/0346* (2013.01)
*H01Q 1/24* (2006.01)
*G06F 3/041* (2006.01)

(52) U.S. Cl.
CPC .......... *G06F 3/0383* (2013.01); *G06F 3/0346* (2013.01); *G06F 3/03545* (2013.01); *G06F 3/04162* (2019.05); *H01Q 1/24* (2013.01); *G06F 2203/0384* (2013.01); *G06F 2203/04101* (2013.01)

(58) Field of Classification Search
CPC ........................... G06F 3/0383; G06F 3/03545
See application file for complete search history.

(56) References Cited

U.S. PATENT DOCUMENTS

| 9,244,545 | B2 | 1/2016 | Hinckley et al. | |
|---|---|---|---|---|
| 9,268,431 | B2 | 2/2016 | King et al. | |
| 9,632,598 | B1* | 4/2017 | Sundara-Rajan | G06F 3/03545 |
| 9,766,723 | B2 | 9/2017 | Hicks et al. | |
| 9,921,626 | B2 | 3/2018 | Bentov | |
| 9,921,684 | B2 | 3/2018 | Falkenburg et al. | |
| 10,101,828 | B2 | 10/2018 | Kaplan | |
| 2002/0148655 | A1* | 10/2002 | Cho | G06F 3/03545 178/18.09 |
| 2012/0327042 | A1* | 12/2012 | Harley | G06F 3/03545 345/179 |

(Continued)

OTHER PUBLICATIONS

"Switch Alpha 12: Active pen", Retrieved From: https://cdn.cnetcontent.com/2d/8a/2d8af5e1-9c8d-4cb7-aa78-e5866b98d648.pdf, Retrieved Date: Apr. 23, 2019, 3 Pages.

*Primary Examiner* — Xuemei Zheng
(74) *Attorney, Agent, or Firm* — Fiala & Weaver P.L.L.C.

(57) ABSTRACT

Methods, devices, systems, and computer program products are provided for adaptive hover operation of touch instruments, which may increase hover height and improve user experience. Hover range may be adapted, for example, by adapting an antenna configuration during hover. A touch instrument may comprise multiple antennas that may be activated and deactivated, e.g., as a function of proximity. Antenna configuration may increment (e.g., increase cumulative antenna size) as hover height increases and decrement (e.g., decrease cumulative antenna size) as hover height decreases. Antennas may be multi-purpose, such as being used to maintain synchronization for extended hover range and for other purposes (e.g., determining hover height, tilt, orientation, grip) and/or features (e.g., providing commands for pop-up menus). Adaptive hover may support (i) maintaining synchronization during use, (ii) faster synchronization when a touch instrument enters or re-enters detectable hover height, (iii) improved palm rejection and (iv) pop up menu presentation.

20 Claims, 7 Drawing Sheets

(56) References Cited

U.S. PATENT DOCUMENTS

2018/0046268 A1    2/2018   Keidar et al.
2018/0129311 A1    5/2018   Westhues et al.
2019/0087025 A1    3/2019   Holsen et al.

* cited by examiner

ADAPTIVE HOVER OPERATION OF TOUCH INSTRUMENTS

BACKGROUND

User interfaces such as touch interfaces allow users to select displayed content, write, draw, shade, etc., by the use of touch instruments. An electrostatic communication link between a touch interface and a touch instrument may be broken when a hover height (e.g., distance between touch instrument and touch device) exceeds approximately 10 mm, which detracts from user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, devices, systems, and computer program products are provided for adaptive hover operation of touch instruments, which may increase hover height and improve user experience. Hover range may be adapted (varied), for example, by adapting an antenna configuration during hover. A touch instrument may comprise multiple antennas that may be activated and deactivated. An antenna configuration may increment to increase cumulative antenna size as hover height increases and decrement to decrease cumulative antenna size as hover height decreases. Antennas may be multi-purpose, such as being used to maintain synchronization for extended hover range and/or for other purposes and/or features. Adaptive hover may support one or more of (i) maintaining synchronization during use, (ii) faster synchronization when a touch instrument enters or re-enters detectable hover height, (iii) improved palm rejection, and/or (iv) pop up menu presentation.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
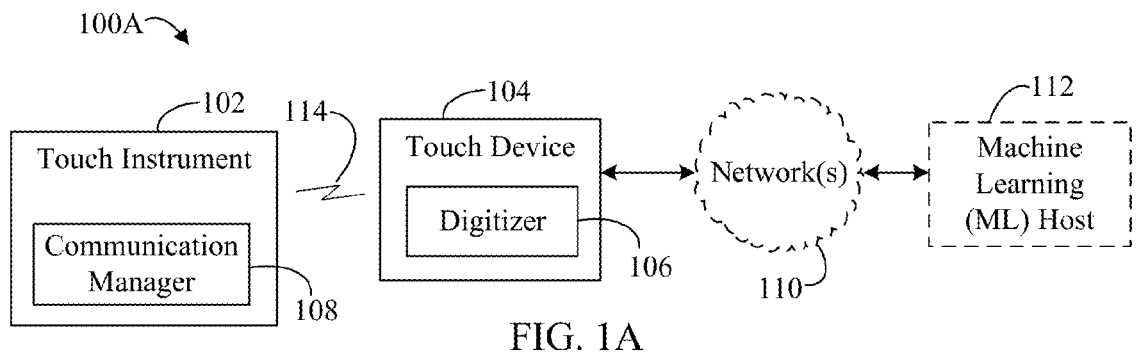
FIG. 1A shows an example system diagram for adaptive hover operation of touch instruments, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Terms such as detect, determine and identify may be used interchangeably.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for adaptive hover operation of touch instruments. Section III below describes example mobile device and computing device embodiments that may be used to implement features of the embodiments described herein. Section IV below describes additional examples and advantages, and Section V provides some concluding remarks.

II. Example Embodiments for an Adaptive Hover Touch Instrument

Methods, devices, systems, and computer program products are provided for adaptive hover operation of touch instruments, which may increase (e.g., triple, quadruple, etc.) hover height and improve user experience. Electrostatic coupling may be varied to extend a hover range of a touch instrument, for example, by adapting a touch device antenna (e.g., an accumulation of multiple antennas) to hover height. A touch instrument may comprise multiple antennas that may be activated and deactivated (e.g., adaptively configured and reconfigured) for transmission, e.g., as a function of hover or hover height. For example, multiple antennas may be incremented to increase cumulative antenna size as hover height increases and decremented to decrease cumulative antenna size as hover height decreases. Antennas may be multi-purpose, e.g., driven with a signal to maintain synchronization for extended hover range and with other signals for other purposes (e.g., determining hover height, tilt, orientation, grip) and/or features (e.g., commands to provide pop-up menus). Antennas may be implemented on an interior and/or exterior enclosure of a touch instrument, such as inside or outside of a cone and/or barrel of a touch instrument. Increasing hover height may support, for example, (i) maintaining synchronization during use (e.g., when a user raises touch instrument while user palm remains on screen), (ii) faster synchronization when a touch instrument enters or re-enters detectable hover height, (iii) improved palm rejection and (iv) pop up menu presentation.

"Hover height" (a/k/a distance, proximity) of a touch instrument relative to a touch device may be determined by force, orientation, and distance detector components of a proximity detector, which may apply logic to sensor data or received signal characteristics (e.g., energies) to determine proximity information. A transmission manager may analyze proximity information to determine whether to adapt/modify a transmission configuration.

"Hover range" of a touch instrument may refer to how far a touch instrument in a particular transmission configuration may hover (e.g., a maximum distance) before losing sync with a touch device. In other words, within a hover range, a transmission configuration of the touch instrument may provide adequate detectability by a touch device to maintain a communication link with the touch device. A transmission configuration may comprise an antenna configuration and transmission signal characteristics (e.g., amplitude, frequency, phase, modulation). As an example use of hover range, a tip antenna may provide P mm of hover range before losing sync with a touch device while a conical ring antenna in a touch instrument combined with the tip antenna may provide a higher hover range of Q mm before losing sync (where Q is greater than P).

Each antenna may have an active range (e.g., a proximity range) where, for a given detected proximity of the touch instrument to a touch device, the antenna may be activated (e.g., coupled to a signal driver for adaptive hover operation). Active/proximity ranges for different antennas may overlap.

Examples of a touch instrument include, without limitation, a touch pen, a stylus, a light pen, a wearable device for a user's finger, a glove, etc. A touch instrument may be held and wielded by a user to interface with a touch device to perform functions such as selecting objects, writing/inking, shading (e.g., low force inking), erasing, and/or the like. For example, when the touch instrument is in contact with the touch device, inking operations may be desired by the user, but when the touch instrument hovers above the touch device, the user may desire inking operations to cease.

An electrostatic communication link between a touch interface and a touch instrument may be broken when a hover height (e.g., distance between touch instrument and touch device) exceeds a particular distance, such as approximately 10 mm. As a result, users may frequently lift the tip of a touch instrument beyond a threshold necessary to maintain an electrostatic communication link. Embodiments herein provide systems and methods in touch instruments that increase hover height and improve user experience and features.

Systems and devices may be configured in various ways for adaptive hover operation of touch instruments. Figures disclose several of many possible embodiments. Dashed components may be presented as a compact way to present several of many possible implementations in one figure. Any combination of some or all components shown may be present with other components in various embodiments.

FIG. 1A shows a block diagram of a system for adaptive hover operation of touch instruments, according to an example embodiment. System 100A is configured to enable adaptive hover operation of touch instruments, according to embodiments. As shown in FIG. 1A, system 100A may include touch instrument 102, touch device 104 and machine learning (ML) host 112. Touch instrument 102 and touch device 104 may communicate with each other via communication signals 114. Touch device 104 and ML host 112 may communicate with each other over a network 110. Various numbers of touch instruments, touch devices, networks, ML hosts and other components may be present in various embodiments.

Touch device 104 and ML host 112 may be communicatively coupled via network 110. Network 110 may comprise any type of communication link or links that connect computing devices and servers such as, but not limited to, the Internet, wired or wireless networks and portions thereof, point-to-point connections, local area networks, enterprise networks, and/or the like.

ML host 112 may comprise, for example, one or more server computers or computing devices, which may include one or more distributed or "cloud-based" servers. In an example, ML host 112 may be associated with, or may be a part of, a cloud-based service platform such as Microsoft® Azure® from Microsoft Corporation of Redmond, Wash. Touch devices, such as touch device 104, may be configured to provide information associated with adaptive hover operation of touch instrument. Information may include, for example, touch instrument type, activation and deactivation of antennas, orientations, distances, received communication signal energies, sensor-detected forces, and/or the like) to ML host 112 via network 110. ML host 112 may be configured to train/re-train/generate models, algorithms, lookup tables, etc., related to one or more operations, such as adaptive hovering, using machine learning techniques based on the information received from the touch devices. Neural networks may be implemented by ML host 112.

Embodiments of ML host 112 may be applicable to any type of system where a system for machine learning communicates with client devices over a network. In an example, ML host 112 may be a "cloud" implementation, application, or service in a network architecture/platform. A cloud platform may include a networked set of computing resources, including servers, routers, etc., that may be configurable, shareable, provide data security, and may be accessible over a network, such as the Internet. Cloud applications/services, such as for machine learning, may run on these computing resources, e.g., atop operating systems that run on the resources, for entities that access the applications/services over the network. A cloud platform may support multi-tenancy, where cloud platform-based software services multiple tenants, with each tenant including one or more users who share common access to software services of the cloud platform. A cloud platform may support hypervisors implemented as hardware, software, and/or firmware that run virtual machines (emulated computer systems, including operating systems) for tenants. A hypervisor presents a virtual operating platform for tenants.

Touch device 104 may be any type of computing device or computing system having an integrated touch interface or a peripheral touch interface, e.g., a touch screen or touch pad, that interfaces with or comprises digitizer 106 associated therewith for interaction with touch instruments. Touch device 104 may be, without limitation, a terminal, a personal computer, a laptop computer, a tablet device, a smart phone, a personal digital assistant, a game console or gaming device, a television, and/or the like that may be utilized by users through interaction with touch instruments, such as touch instrument 102, to perform inking operations. For example, touch instrument 102 may be utilized via the touch interface and digitizer 106, e.g., by contact/interaction provided at a touch screen, to perform inking operations.

Digitizer 106 may comprise a controller, one or more antennas, and/or the like. Digitizer 106 may be configured to receive/transmit communication signals via an antenna or antennas from/to touch instrument 102, according to embodiments. A controller or processor of digitizer 106 may receive commands and information from touch instrument 102, for example, to determine when and/or where to implement inking operations and/or provide to the user via a user interface (UI), e.g., on a display, a touch screen, and/or the like. For example, a touch device may be configured to execute software applications that cause content to be displayed to users via UIs associated with touch interfaces. Software applications may enable users to provide selection indicia for content, to perform inking operations, etc., via touch interfaces and touch instruments.

Touch instrument 102 may include an instance of a communication manager 108. Communication manager 108 may be configured to perform adaptive hover operations. In an example, a user may interact with a touch interface of touch device 104 (e.g., via digitizer 106) using touch instrument 102. Communication manager 108 may be configured to receive communication signal information via one or more antennas of touch instrument 102 and/or a hardware-based force sensor, and to determine characterization information of touch instrument 102, e.g., to determine adaptive hover operations, inking operation, etc. Proximity detection may indicate a touch mode, a hover mode and/or specific hover distance between touch instrument 102 and touch device 104, for example, to decide whether to perform an inking operation, adapt antennas and transmissions to maintain synchronization with a touch device, etc. For example, different configurations of antennas, drivers, signals, signal frequencies and/or different amounts/types of inking (e.g., full inking, light inking or shading, erasing, no inking) may be based on a distance between touch instrument 102 and touch device 104.

Communication manager 108 may be implemented in hardware, custom hardware, hardware combined with one or both of software and/or firmware, and/or as program instructions encoded on computer-readable storage media, and may be configured to perform any functions and/or operations described herein for adaptive hover operation of touch instruments in touch instruments. In embodiments, such functions and/or operations may be performed based on one or more lookup tables stored in a memory (not shown, but described below) of touch instrument 102. Lookup tables may be generated by touch instrument 102, or may be provided to touch instrument 102 via any communication link from touch device 104 and/or via a Wi-Fi connection or the like from ML host 112.

Figure 1B:
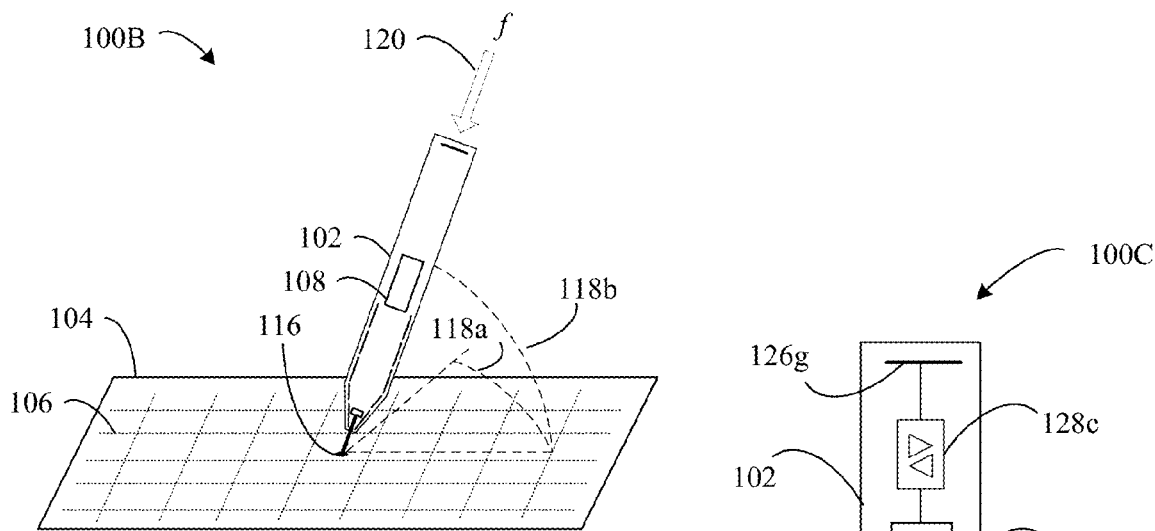
FIGS. 1B and 1C show examples of touch instruments for adaptive hover operation, according to example embodiments.
Figure 1C:
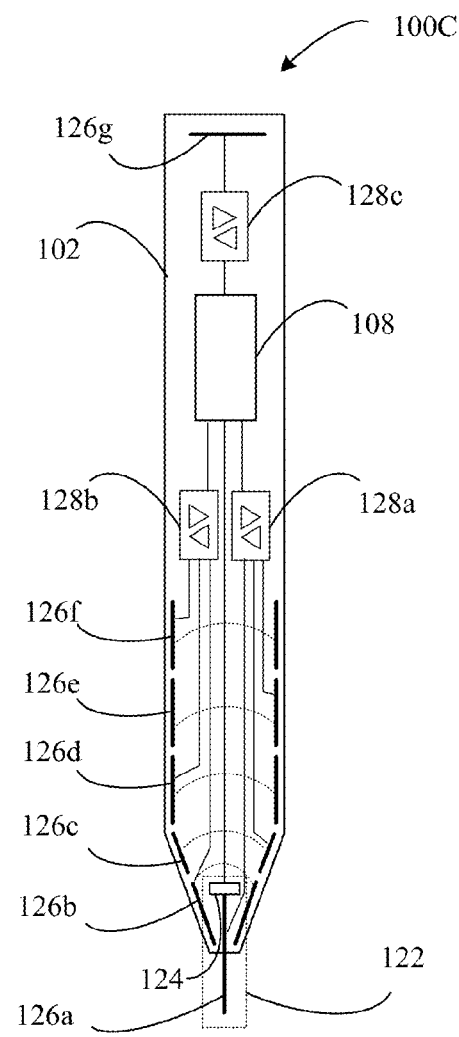

FIGS. 1B and 1C show diagrams of touch instruments for adaptive hover operation of touch instruments, according to example embodiments. FIG. 1B shows example system 100B comprising touch instrument 102, touch device 104 and digitizer 106. FIG. 1C shows example system 100C with example details and features of touch instrument 102, including an example of adaptive hover antennas 126a-126f. FIG. 1D shows example system 300 with an example of adaptive hover antennas 126a-126f.

Example system 100B of FIG. 1B shows touch instrument 102 interfacing with antennas of digitizer 106, e.g., as an example of a user interacting with displayed content that may be displayed by a display screen of touch device 104. Touch instrument 102 may be held by a user at various distances, with various characteristics, and/or with various orientations with respect to touch device 104 (and digitizer 106). For example, touch instrument 102 may interact with touch device 104 at location 116 with, e.g., with force 120 (or pressure) being applied by a user. Location 116 may correspond to, for example, content displayed by, or a location for inking operations to be performed on, touch device 104. A distance of touch instrument 102 from touch device 104 at location 116 may be zero or approximately zero, for example, when force 120 is detected as being greater than zero or approximately greater than zero (e.g., $f>2$ grams). A distance between location 116 and touch instrument 102 may be greater than zero (e.g., no contact or hovering), for example, when force 120 is less than approximately 2 grams (e.g., approximately zero). Force 120 may vary corresponding to different inking operations. For example, a user may press harder with more force 120 through touch instrument 102 to apply full inking, or conversely, may apply less force 120 to apply light inking or shading. Distances and forces that may be involved in various may be determined and/or identified by communication manager 108.

Touch instrument 102 may have an orientation with respect to the surface of touch device 104 (e.g., with respect to the plane in which antennas of digitizer 106 reside). An axis corresponding to the length of touch instrument 102 may be indicative of the orientation thereof. Such an axis may be defined by an azimuth angle 118a and a longitudinal angle 118b. Location 116 is shown as an example reference point to determine azimuth angle 118a and longitudinal angle 118b with respect to touch device 104. Any reference point of touch device 104 may be used to determine an orientation of touch instrument 102. Orientations may be changed by altering one or more of azimuth angle 118a and/or longitudinal angle 118b. A given orientation of touch instrument 102 may cause more or less of touch instrument 102 to be horizontally aligned to (e.g., be closer to, or further from) the plane of the antennas of digitizer 106. An orientation of touch instrument 102 may correspond to the exposure of antennas of touch instrument 102 with communication signals transmitted by the antennas of touch device 104. Different communication signal energies (e.g., electrostatic (capacitive) coupling) may be determined for different antennas of touch instrument 102 by communication manager 108 for different orientations of touch instrument 102.

Example system 100C of FIG. 1C shows a cross section of an example of touch instrument 102, including communication manager 108, sensors and antennas. For example, touch instrument 102 may include one or more antennas 126a-126g. In an example, antennas 126a-126f may be controlled by communication manager 108 to provide adaptive hover operation. An (e.g., each) antenna may be configured to transmit and/or receive communication signals to and/or from a touch device (e.g., touch device 104). Antennas 126a-126f may be electrically coupled to one or more drivers (e.g., transceivers), such as transceiver 128a, transceiver 128b and/or transceiver 128c. In an example, transceivers may be part of communication manager 108. One or more antennas 126a-126g may be multi-purpose/multi-use. In an example, antenna 126a (e.g., tip antenna), antenna 126c (e.g., tilt antenna), antenna 126g (e.g., tail antenna) may be used by a proximity detector (e.g., in communication manager 108) to determine hover height (e.g., distance between touch instrument 102 and touch device 104) and orientation of touch device.

Adaptive hover antennas 126b-126f may be implemented, for example, as rings on the interior and/or exterior enclosure of touch instrument 102. Rings may be continuous or multiple discrete or segmented sections with connections (e.g., as shown by dashed lines connecting) portions of antennas 126b-126f. Antennas 126b and 126c may be, for example, conical shape rings, which may be dependent upon the enclosure of touch instrument 102. Antennas 126d-f may comprise, for example, cylindrical-shape rings, which may be dependent upon the enclosure of touch instrument 102. Implementations may comprise any number and type of antennas for adaptive hover operation. Adaptive hover antennas 126b-126f may be coupled to one or more drivers (e.g., transceivers), switches and/or multiplexers to selectively drive and/or receive one or more signals on one or more antennas. Components (e.g., drivers, switches and/or multiplexers) may be controlled by communication manager 108 to provide adaptive hover operation (e.g., transmission, reception of one or more signals by one or more adaptive hover antennas 126b-126f).

Adaptive hover operation of antennas 126b-126f may be based, at least in part, on a detection of hover mode and/or determined hover heights. An example implementation may utilize capacitive coupling to estimate proximity (e.g., hover height). One or more adaptive hover antennas (e.g., antenna 126b) may be used to determine hover height. Different areas of antenna 126a, antenna 126c, and antenna 126g may be exposed to communication signals from digitizer 106 based on the capacitance related to the exposed areas. Energy (e.g., electrostatic energy) of the communication signals received may be utilized to differentiate orientations and distances as described herein. Antennas may have different alignments with respect to touch instrument 102. In an example, antenna 126a may be parallel to the axis of touch instrument 102, antenna 126g may be perpendicular to the axis of touch instrument 102 and antenna 126c may be at an angle that is neither parallel nor perpendicular to the axis of touch instrument 102.

Adaptive hover operation of antennas 126b-126f may be based, at least in part, on a detection of hover mode (e.g., with or without regard to capacitive coupling or estimated hover height). Touch instrument 102 may comprise hardware-based force sensor 122. Force sensor 122 may comprise a tip with antenna 126a and a sensor portion 124. Sensor portion 124 may be configured to sense a force applied to the tip through user interactions with touch instrument 102. Sensor portion 124 may be electrically coupled (e.g. and configured to provide indicia of forces sensed thereby) to communication manager 108.

In an example, touch instrument 102 may be calibrated to determine a baseline distance or height with respect to touch device 104. For example, a user may initiate contact between touch instrument 102 and touch device 104 as part of a calibration function (e.g., according to an example provided herein) for determining distances, where the distance for the calibration is known to be zero. Calibration may determine orientations and communication signal energies for various distances at various increments (e.g., 0 mm, 1 mm, 2 mm, 3 mm, 20 mm, 30 mm, 40 mm). Calibration results may be stored in memory (e.g., in lookup tables). Calibration may be performed at different orientations. Calibration may be performed periodically and/or on demand (e.g., by a user, touch instrument 102 and/or touch device 104).

Figure 2:
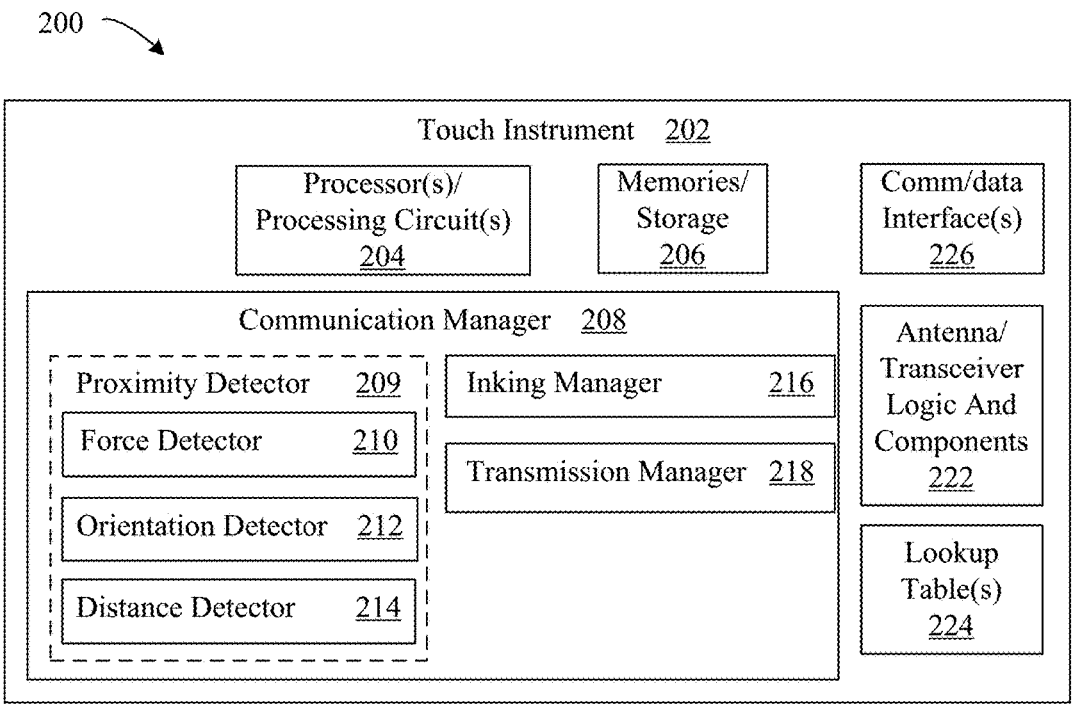
FIG. 2 shows an example system diagram for adaptive hover operation of touch instruments, according to an example embodiment.

FIG. 2 shows an example system diagram for adaptive hover operation of touch instruments, according to an example embodiment. Example system 200 may be an embodiment of example system 100A of FIG. 1, example system 100B of FIG. 1B, example system 100C of FIG. 1C and/or example system 300 of FIG. 1D, e.g., including touch instrument 102 and communication manager 108.

Example system 200 comprises touch instrument 202, which may be an embodiment of touch instrument 102 of FIGS. 1A-1C and may be any type or style of touch instrument, as mentioned elsewhere herein, or as otherwise known. Example touch instrument 202 may comprise one or more processors (hereinafter "processor") 204 (e.g., including processing circuits), one or more memories and/or other physical storage device (hereinafter "memory") 206, one or more communication/data interfaces (hereinafter "interface") 226, antenna/transceiver logic and components 222, and communication manager 208, which may be an embodiment of communication manager 108 of FIGS. 1A-1C. System 200 may comprise lookup table(s) 224, which may be stored in memory 206. System 200 may comprise additional and/or alternative components (not shown for brevity and illustrative clarity), such as, for example, components and subcomponents of other devices and/or systems herein (e.g., force sensor 122 shown in FIG. 1C), components described with respect to FIGS. 9 and 10 further below, such as an operating system, basic input/output system (BIOS), etc.

Processor 204 and memory 206 may, respectively, be any type of processor circuit and memory that is described herein, and/or as would be understood by a person of skill in the relevant art(s) having the benefit of this disclosure. Processor 204 and memory 206 may, respectively, comprise one or more processors or memories, different types of processors or memories, etc. Processor 204 may comprise circuitry configured to execute computer program instructions, such as but not limited to embodiments of communication manager 208, which may be implemented as computer program instructions for adaptive hover operation of touch instruments, etc. Memory 206 may be configured to store computer program instructions/code and other information and data described herein (e.g., lookup tables, calibration information and so on). Examples of processor 204 and memory 206 may be provided in examples shown in FIGS. 9 and 10.

Interface 226 may comprise any type or number of wired and/or wireless network adapter, modem, etc., configured to enable system 200 to communicate with other devices over a network, such as communications between system 200 and other devices utilized in a network (e.g., network 110). Interface 226 may include hardware and/or software and may support any type of input devices, sensors, and touch instruments that may be used for wired and/or wireless communications, such as an electronic pen, a stylus, a light pen, force sensors, a mouse, a touch screen, a touch pad, a microphone, a camera, a kinetic sensor, a physical keyboard, a trackball, gloves, other wearables or sensors, etc., and/or the like. In an example, interface 226 may comprise input and output portions. For example, interface 226 may support Wi-Fi, Bluetooth®, and other types of radio frequency communication signals. Additional input/output functions may be supported by interface 226, for example, as described below with respect to examples shown in FIGS. 9 and 10.

Antenna/transceiver logic and components 222 may be configured to receive and/or transmit communication signals of various types and protocols from and/or to antennas of touch devices (e.g., antennas 126a-126g shown by examples in FIGS. 1C and 1D). Antenna/transceiver logic and components 222 may comprise, for example, antennas 126a-126g and transceivers 128a-128c shown by examples in FIGS. 1C and 1D. Antenna/transceiver logic and components 222 may be configured, for example, to receive and quantify communication signal energies received at touch instrument 202 and provide such information to communication manager 208 and to selectively activate and transmit appropriate signals on antennas 126a-126g (e.g., as may be directed by communication manager 108 for adaptive hover operations, inking operations and so on). Antenna/transceiver logic and components 222 may be part of, or work in conjunction with, interface 226 for transmitting/receiving communication signals with a touch device (e.g., touch device 104).

Lookup table(s) 224 may include, without limitation, one or more tables that store relationships between adaptive hover operations, orientations, distances, electrostatic coupling, communication signal energies, detectability range, antennas (e.g., number of antennas or cumulative antenna size), signal characteristics, etc. Lookup table(s) 224 may be stored, for example, in memory 206, and may be referenced by processor 204 and/or communication manager 208 for determinations of adaptive hover operations, orientations, distances, electrostatic coupling, communication signal energies, detectability range, antennas (e.g., number of antennas or cumulative antenna size), signal characteristics, etc. Lookup table(s) 224 may be dynamically created and/or updated, or may be predetermined.

Communication manager 208 comprises a plurality of components for performing the functions and operations described herein for adaptive hover operation of touch instruments. Example communication manager 208 may comprise, for example, proximity detector 209 (e.g., force detector 210, orientation detector 212 and distance detector 214), inking manager 216 and transmission manager 218. Some components may be omitted for clarity. While shown separately for illustrative clarity, in embodiments, one or more components may be combined together and/or as a part of other components of example system 200. In an example, force detector 210, orientation detector 212 and distance detector 214 may be components of proximity detector 209 that determines touch mode, hover mode and/or specific hover distances between a touch instrument and a touch device. In another example, processor 204, memory 206, and communication manager 208 (e.g., with or without other components), may comprise an integrated circuit (e.g., in a custom hardware implementation). Some implementations may have more or fewer components shown in example communication manager 208. One or more components of communication manager 208 (e.g., software-implemented components) may be stored in memory 206 and executed/executable by processor 204.

Proximity detector 209 may comprise one or more types of detectors that detect a proximity between touch instrument 102 and touch device 104 (e.g., digitizer 106). A detector may comprise one or more sensors (e.g., force sensor) or other detection devices (e.g., antenna, transceiver) with or without processing logic implemented in hardware, software and/or firmware. Proximity of touch instrument 102 to touch device 104 may comprise, for example, touch mode, hover mode and/or specific distances between touch instrument 102 to touch device 104.

Touch instruments may determine proximity, for example, based on a force detector, an orientation detector and/or a distance detector. A force detector may distinguish between a touch mode and a hover mode of a touch instrument. A distance detector (e.g., which may utilize orientation) may determine whether a touch instrument is in touch mode or hover mode. In an example, one or more antennas may receive energies from communication signals of touch devices to determine orientations of the touch instruments with respect to the touch devices. A distance between the touch instrument and the touch device may be determined, for example, based on the orientation and the energies. The determined distance may provide an indication whether contact is being made with a touch device by the touch instrument (e.g., touch mode), or whether the touch instrument is hovering above the touch device (e.g., hover mode). A force detector and a distance detector may be used concurrently.

Force detector 210 may be configured to receive inputs, via an input interface of interface 224, from a force sensor of touch instrument 202, such as force sensor 122 shown in FIG. 1C. Inputs may be generated, for example, by interaction between a tip of a touch instrument 102 and a touch interface (e.g., glass surface) of a touch device 104. For example, touch instrument 102 shown in FIG. 1B (of which touch instrument 202 may be an embodiment) interfaces with touch device 104 to generate an input at sensor portion 122 of force sensor 124 shown in FIG. 1C (of which touch instrument 202 may be an embodiment). Force detector 210 may be configured to determine characterization information or characteristics of the interaction between touch instrument 102 and touch interface of touch device 104, e.g., a force applied, and to provide indicia of such information to force detector 210 via interface 226. Force detector 210 may determine or quantify the amplitude of force applied via the information. Sensor portion 122 of force detector 202 may be coupled to communication manager 108. Proximity detector 209 and/or one or more other components may analyze or apply logic (e.g., circuitry and/or one or more algorithms) to force information (e.g., data in signals) to detect (e.g., determine) touch mode, hover mode and any related determinations (e.g., a degree of touch force applied, which may impact a type of inking operation selected by inking manager 216).

Orientation detector 212 may be configured to determine an orientation of touch instrument 202 (e.g., relative to a touch device, such as touch device 104). For example, orientation detector 212 may be configured to receive information, such as signal energy(ies) detected for one or more communication signals from a touch device received by touch instrument 202 (e.g., via one or more antennas and antenna/transceiver logic 222 and/or interface 226). Orientation detector 212 may be configured to determine an orientation of touch instrument 202 based on such information. Antennas may have a known position and orientation relative to touch instrument 202. Orientation detector 212 may be configured to determine orientations of touch instrument 202 with respect to a touch device based on various communication signal energies received at multiple antennas. In an example, differences in durations of signal flight prior to reception by antennas may be used to determine orientations.

Distance detector 214 may be configured to determine a distance (e.g., hover height) between touch instrument 202 and a touch device (e.g., touch device 104). For example, distance detector 214 may be configured to determine distance based on electrostatic (e.g., capacitive) coupling information, such as signal energy(ies) detected for one or more communication signals from a touch device received by touch instrument 202 (e.g., via one or more antennas and antenna/transceiver logic 222 and/or interface 226). In an example, distance detector 214 may be configured to determine distance based on communication signal energy(ies) and an orientation determined by orientation detector 212. An orientation and communication signal energies at the orientation may be used (e.g., by distance detector 214) to determine distance (e.g., hover height) at one or more locations on a touch instrument. In an example, differences in durations of signal flight prior to reception by antennas may be used to determine distance.

Proximity detector 209 (e.g., force detector 210, orientation detector 212 and distance detector 214) may provide a common resource for inking manager 216 and transmission manager 218 to apply control logic to proximity information/data. Proximity data may be buffered (e.g., stored), for example, in memories/storage 206 for access by inking manager 216 and transmission manager 218.

Inking manager 216 may be configured to generate commands to activate and deactivate inking operations at a touch device (e.g., touch device 104). In an example, inking manager 216 may generate an activation command or a deactivation command for inking operations at a touch device, for example, based on proximity data. Commands generated by inking manager 216 may include information related to the type of inking operation to be performed, the location of touch instrument 202 relative to the touch device or its digitizer, the orientation of the touch instrument 202, etc.

Transmission manager 218 may be configured to manage transmissions, which may comprise adapting transmissions by touch instrument 202 to maintain a communication link with touch device 104 (e.g., a hover range). Transmission manager 204 may be configured to provide adaptive hover operations by controlling antenna configurations and transmission signal characteristics based on proximity information.

Transmission manager 218 may access recent proximity data (e.g., in data buffer). Proximity data accessed may include, for example, several recent sets of proximity data, which may be used to determine a direction (increasing or decreasing hover height). In an example, antennas may be activated and deactivated based on different thresholds for ascending and descending movement (e.g., to avoid jitter by implementing hysteresis).

Transmission manager 218 may analyze proximity data to determine whether an existing antenna and signal transmission configuration provides adequate detectability (e.g., hover range) or needs to be adapted for a touch instrument to maintain (e.g., or reacquire) a communication link (e.g., synchronization) with a touch device. The decision may be presented, for example, as whether to modify a touch instrument's current hover range capability based on a detected hover height of the touch instrument. A decision may be based, for example, on a comparison of proximity data to one or more proximity thresholds (e.g., electrostatic coupling energy or distance thresholds for a transmission configuration). Decision logic may be implemented, for example, in the form of circuitry, software algorithm(s) and/or look up table mapping of proximity data to transmission configuration.

Transmission manager 218 may execute a reconfiguration, for example, when it is determined that a transmission configuration should be adapted to provide adequate detectability to maintain a communication link. Transmission manager 218 may selectively reconfigure (e.g., activate and/or deactivate) antennas and/or modify one or more transmission signal characteristics (e.g., amplitude, frequency, phase, modulation). Transmission manager 218 may cause one or more signals to be transmitted on one or more antennas in the reconfigured transmission configuration.

A touch instrument may have two or more transmission antennas to effectuate hover adaptation (e.g., a tip antenna and at least one adaptive hover antenna). Antennas may be combined in stages. An adaptive hover antenna and/or transmission procedure may comprise one or more stages. Antennas may be incremented and decremented (e.g., stepped) in any fashion (e.g., thermometer, binary) to provide suitable hover range capability for detected or anticipated hover height or proximity.

In an example, a first antenna may be activated to provide a first hover range of a touch instrument when a detected proximity is in a first proximity range, a second antenna may be activated to provide a second hover range of a touch instrument when a detected proximity falls within a second proximity range, a third antenna may be activated to provide a third hover range when a detected proximity is in a third proximity range, and so on.

Cumulative antenna size may increase with increasing hover height (e.g., proximity) and may decrease with decreasing hover height. In an example, a transmission antenna reconfiguration may increase or decrease a cumulative size of an antenna (e.g., comprising one or more antennas), which may increase or decrease electrostatic coupling between a touch instrument and a touch device.

In an example, one or more signal characteristics may be adapted by transmission reconfiguration. Prevailing conditions (e.g., signal interference) and/or operating parameters (e.g., power consumption) may factor into configuration decisions. In an example, frequency may be changed, e.g., to avoid signal interference and/or reduce power consumption. In another example, amplitude, phase and/or modulation may be modified.

Transmission manager 218 may cause one or more signals to be transmitted on the adapted configuration.

Accordingly, touch instrument 202 and communication manager 208 may operate in various ways for adaptive hover operation of touch instruments. Additional examples regarding touch instrument 202 and its components (e.g., proximity detector 209 and communication manager 208), are provided below. In various embodiments, one or more components and/or subcomponents of touch instrument 202 may be included in a touch device, such as touch device 104, to perform corresponding functions therein. For example, touch device 104 may determine proximity and provide proximity data to touch instrument or command touch instrument to adapt its transmission configuration based on proximity (e.g., hover height). Touch device 104 may be made aware of adaptive transmission reconfiguration capabilities of touch instrument 102.

Figure 3:
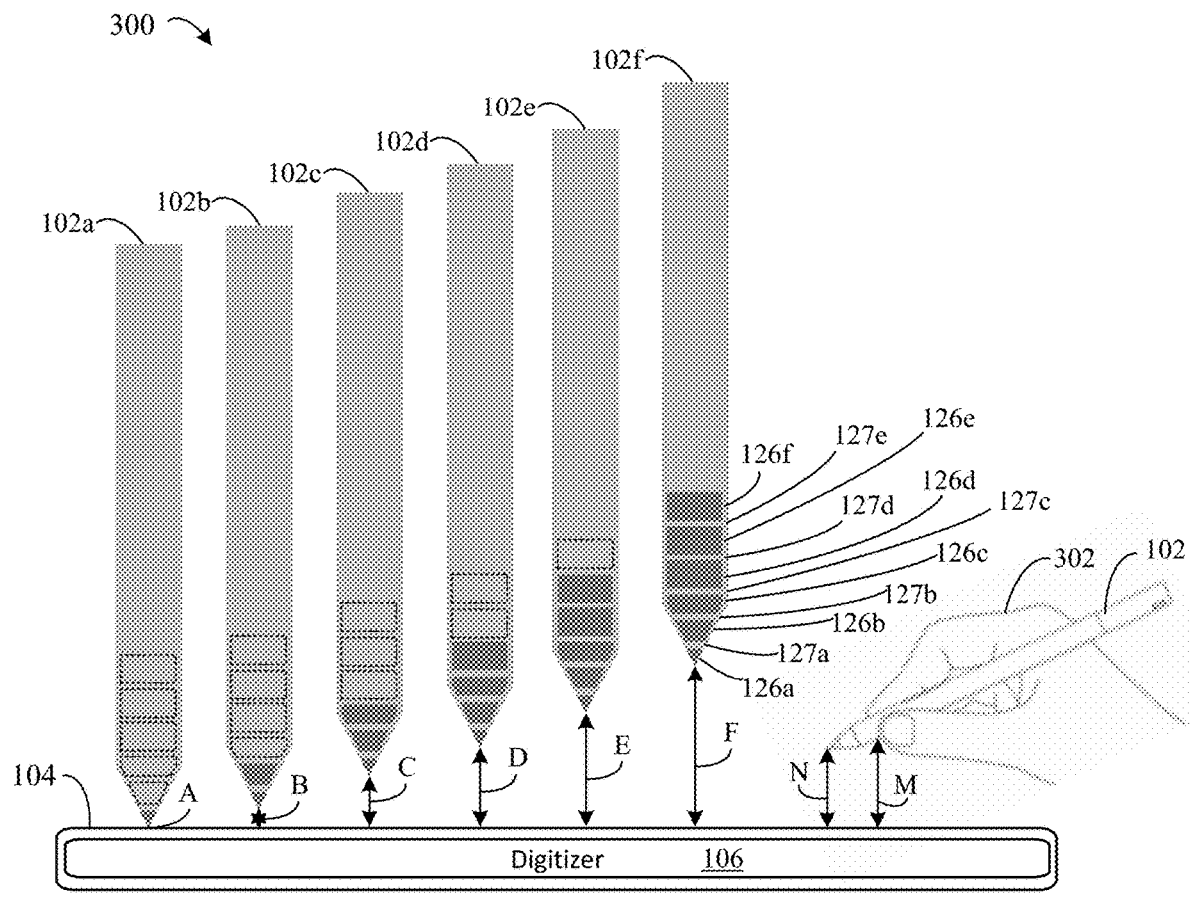
FIG. 3 shows an example of adaptive hover operation of touch instruments, according to an example embodiment.

FIG. 3 shows an example of adaptive hover operation of touch instruments, according to an example embodiment. Example system 300 shows example operation of a transmission manager (e.g., transmission manager 208). System 300 comprises touch device 104 with digitizer 106 and touch instrument 102 with tip antenna 126a and adaptive hover antennas 126b-126f. Six examples are presented of touch instrument 102 (e.g., 102a-102f) at various detected hover heights A-F. Hover heights may be determined, for example, by proximity detector 209 processing signals received by one or more antennas 126a-126f from digitizer 106. In an example (e.g., as shown in FIG. 3), adaptive hover antennas 126b-126f are shown implemented as continuous rings on an interior of an enclosure of touch instrument 102. They may be implemented differently in other embodiments. Antennas may have any size and shape and need not be uniform in size. Adaptive hover antennas 102b-102f are shown separated by insulators 127a-127e, which may comprise an insulative material (e.g., plastic), which may permit separate control (e.g., activation/deactivation or coupling/decoupling to/from one or more drivers) of antennas 126a-126f by communication manager 108/208.

Antennas 126a-126f may be multi-purpose, supporting adaptive hover operation and determinations of hover height, orientation and/or other support operations and features of touch instrument 102. Antennas or electrodes implemented on an exterior of touch instrument 102, which user 302 may contact, may be used to determine how a user is holding touch instrument 102. Antennas a user is not touching (e.g., grounding) may be used for one or more purposes, which may include adaptive hover operations, distance and orientation determinations, among other support operations and features.

As illustrated in FIG. 3, user 302 may hold touch instrument 102 at an angle, raising and lowering all or a portion of touch instrument 102 as desired to write, draw, pause, access and navigate menus and so on. Hover distances may vary along the length of touch instrument 102, for example, when held at an angle. In an example orientation of touch instrument 102, a tip of touch instrument may have a hover height N while a lower end of a barrel of touch instrument 102 (e.g., approximately at antenna 126d) may have a hover height M. Without adaptive hover antennas 126b-126f and transmission manager 218 providing adaptive hover transmissions, tip antenna 126a alone may lose synchronization when user 302 raises the tip of touch instrument 102 beyond a hover range capability of tip antenna 126a.

The example shows user 302 raising (or lowering) touch instrument 102 relative to touch device 104 so that hover height N of tip antenna 126a rises (or falls) to each proximity threshold height A-F. Six different transmission configurations of touch instrument 102 (e.g., 102a-102f) show a series of proximity detections (e.g., proximity A-F determined by proximity detector 209) and a series of adaptive hover operations (e.g., by transmission manager 218) that reconfigure the transmission configuration. Transmission manager 218 may control transceivers 128a, 128b, switches (not shown), tip antenna 126a and adaptive hover antennas 126b-126f. Touch instrument states 102a-102f show adaptive hover antennas 126b-126f in two states, e.g., active (e.g., configured to transmit a signal) and inactive (e.g., not configured to transmit a signal). An activated antenna may, for example, be coupled (e.g., through a switch) to a driver (e.g., transceiver 128a, 128b) while a deactivated/inactive antenna may not. Dashed lines represent inactive antennas and shaded areas indicate active antennas.

Touch instrument in a first transmission configuration 102a is shown in touch mode (e.g., hover distance A determined to be approximately zero according to proximity detector 209). Touch instrument 102a is shown with tip antenna 126a active and adaptive hover antennas 126b-126f inactive.

Touch instrument in a second transmission configuration 102b is shown at hover height B with tip antenna 126a and adaptive hover antenna 126b active and adaptive hover antennas 126c-126f inactive.

Touch instrument in a third transmission configuration 102c is shown at hover height C with tip antenna 126a, adaptive hover antennas 126b and 126c active, and adaptive hover antennas 126d-126f inactive.

Touch instrument in a fourth configuration 102d is shown at hover height D with tip antenna 126a and adaptive hover antennas 126b-d active, and adaptive hover antennas 126e and 126f inactive.

Touch instrument in a fifth transmission configuration 102e is shown at hover height E with tip antenna 126a and adaptive hover antennas 126b-126e active, and adaptive hover antenna 126f inactive.

Touch instrument in a sixth transmission configuration 102f is shown at hover height F with tip antenna 126a and adaptive hover antennas 126b-126f active.

Touch instrument configurations 102a-102f show transmission manager 218 increasing a cumulative antenna size in response to increasing detected hover height, which may increase electrostatic coupling between touch instrument 102/202 and touch device 104. Increasing transmission antenna size may increase detectability of touch instrument 102 by touch device 104, for example, to establish or maintain a communication link or synchronization. In reverse, touch instrument configurations 102a-102f show transmission manager 218 deactivating antennas to decrease a cumulative antenna size in response to decreasing detected hover height.

Tip antenna 126a is shown as remaining active in each adaptive hover transmission configuration 102a-102f but may be deactivated in one or more adaptive hover operations in various implementations.

Transmission manager 218 is shown (in this example) incrementing by one antenna (or decrementing by one antenna) as each hover height threshold A-F is reached while ascending (or descending). However, various embodiments may increment and/or decrement antennas by any number.

Decrementing may be symmetrical or asymmetrical relative to incrementing. In an example, a reconfiguration operation or step may activate two antennas and deactivate one antenna. Some embodiments may have only one adaptive hover antenna, which may be activated and deactivated. Hover height in the example is shown based on hover height N of tip antenna 126a, but may be based on hover height of any part of touch instrument 102 (e.g., hover height M of antenna 126d), which may be determined by orientation and hover height calculations by proximity detector 209. In an example, activation and deactivation of antennas in adaptive hover operations may be based on multiple hover heights (e.g., at multiple locations) of touch instrument and/or touch instrument orientation (e.g., relative to multiple thresholds).

A delay between reconfigurations and/or hysteresis may avoid ON/OFF jitter. Hysteresis may be implemented in one or more adaptive hover operations, such that an activation trigger/threshold for an ascending touch instrument may be different from a deactivation trigger/threshold for a particular antenna for a descending touch instrument approaching a touch device.

Reconfiguration of antennas (e.g., activating and/or deactivating antennas) may be a function of one or more variables (e.g., hover distance, orientation, how the instrument is held). Reconfiguration of signal characteristics (e.g., amplitude, frequency(ies), phase, voltage level, modulation) for signals driven on antennas may be a function of one or more variables (e.g., hover distance, timing, other signals, interference, power consumption, user preferences such as power conservation settings). In an example, an adaptive hover operation may reduce signal frequency to reduce power consumption. Signals transmitted through antennas 126a-126f during one or more adaptive hover operations may be the same or different, e.g., for the same or different purposes in frame-based transmissions.

Figure 4:
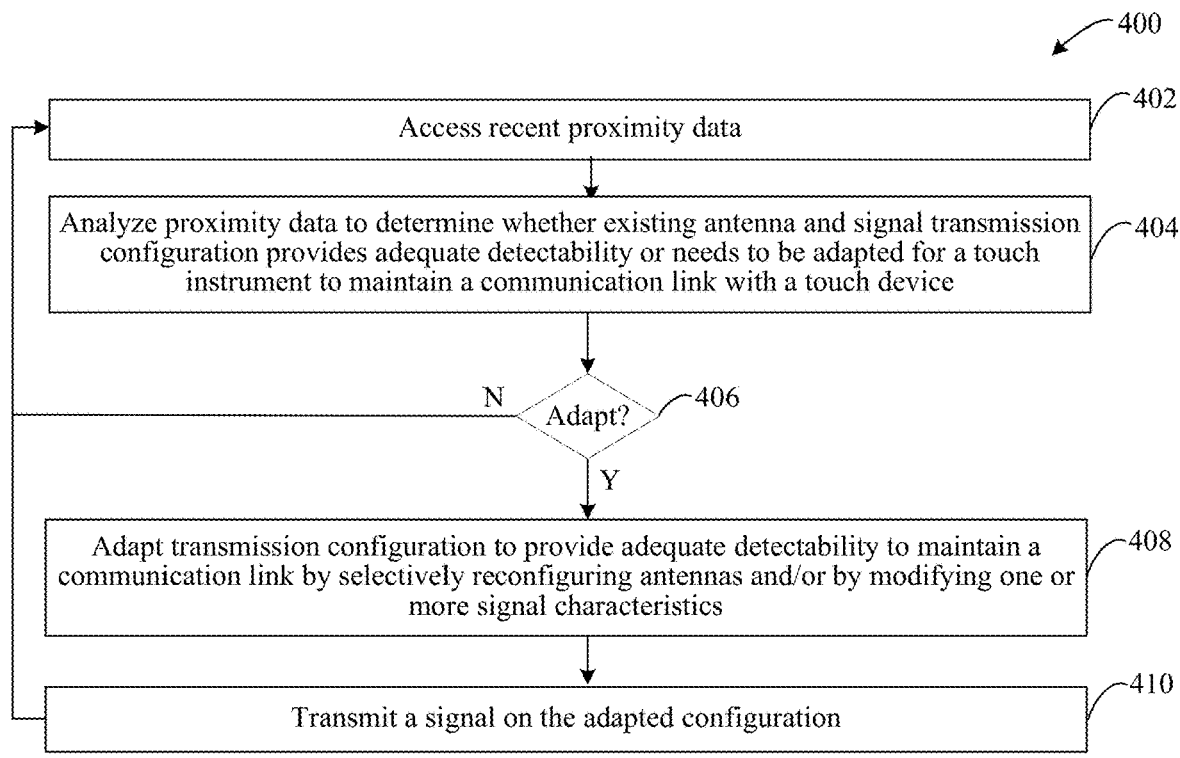
FIG. 4 shows a flowchart for adaptive hover operation of touch instruments, in accordance with an example embodiment.

Embodiments may also be implemented in processes or methods. For example, FIG. 4 shows a flowchart of an example method 400 for adaptive hover operation of touch instruments, according to an example embodiment. Embodiments disclosed herein and other embodiments may operate in accordance with example method 400. Method 400 comprises steps 402-410. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Method 400 comprises step 402. In step 402, recent proximity data (e.g., in data buffer) may be accessed. For example, as shown in FIG. 2, transmission manager 218 may (e.g., periodically) access memories/storage 206 for one or more sets of recent proximity data.

In step 404, proximity data may be analyzed to determine whether an existing antenna and signal transmission configuration provides adequate detectability (e.g., hover range) or needs to be adapted for a touch instrument to maintain a communication link with a touch device. For example, as shown in FIG. 2, transmission manager 218 may analyze proximity data, e.g., compared to one or more thresholds or other determination information in lookup table(s) 224, to determine whether to modify an existing transmission configuration of antennas 126a-126f and/or signals transmitted thereon.

In step 406, a decision is made whether to adapt (e.g., modify) an existing transmission configuration. A decision not to modify an existing transmission configuration may return to step 402. A decision to modify an existing transmission configuration may proceed to step 408.

In step 408, a transmission configuration may be adapted to provide adequate detectability to maintain a communication link (e.g., hover range) by selectively reconfiguring (e.g., activating and/or deactivating) antennas and/or by modifying one or more signal characteristics. For example, as shown in FIGS. 2 and 3, transmission manager 218 may reconfigure a transmission configuration from transmission configuration 102e to transmission configuration 102f.

In step 410, a signal may be transmitted on the adapted configuration. For example, as shown in FIGS. 2 and 3, transmission manager 218 may transmit one or more signals through antennas 126a-126f via transceivers 128a, 128b shown in FIG. 1C.

Touch instrument 202, communication manager 208 may operate according to flowchart 500, in embodiments.

Figure 5:
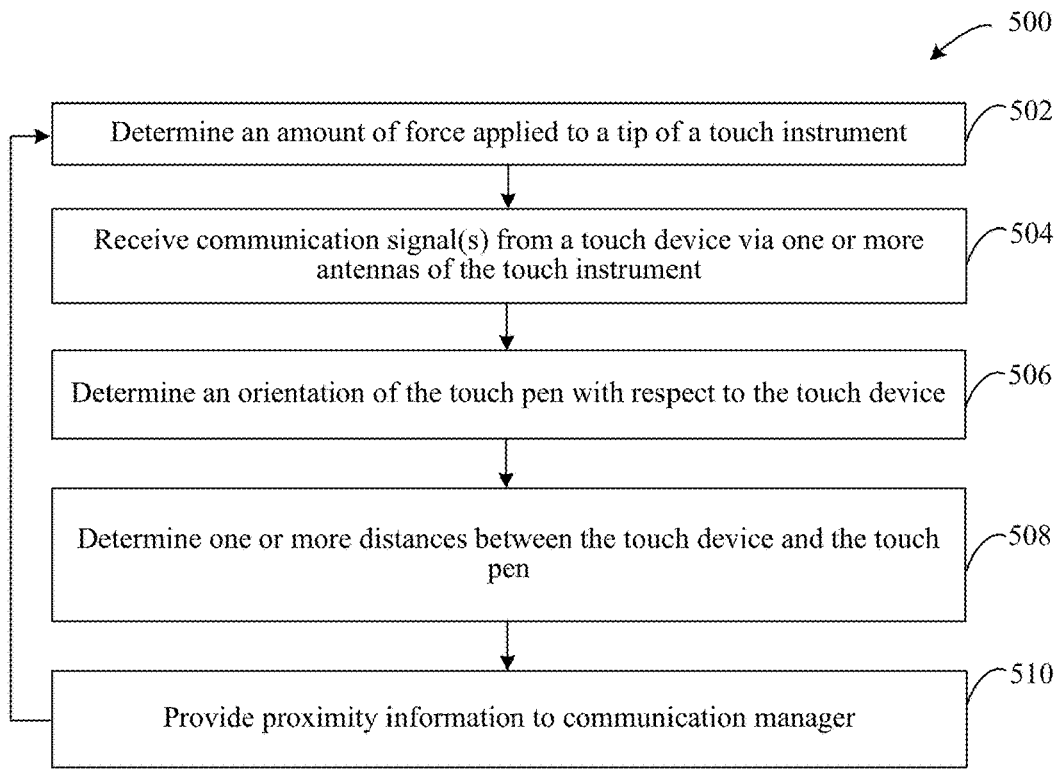
FIG. 5 shows a flowchart for adaptive hover operation of touch instruments, in accordance with an example embodiment.

FIG. 5 shows a flowchart for adaptive hover operation of touch instruments, in accordance with an example embodiment. FIG. 5 shows example flowchart 500 for determining force, distance and orientation information for adaptive hover operation of touch instruments, according to an example embodiment. Embodiments disclosed herein and other embodiments may operate in accordance with example method 500. For example, touch instrument 102/202, communication manager 108/208 and proximity detector 209 may operate according to method 500. Method 400 comprises steps 502-510. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Flowchart 500 begins at step 502. In an example, calibration of the touch instrument, e.g., prior to performing step 502. In step 502, an amount of force applied to a tip of a touch instrument may be determined. For example, force detector 210 may be configured to determine whether any force is applied and, if so, an amount of force applied to the tip of touch instrument 102, e.g., a touch pen. Force sensor 122 may include antenna 126a, which may also function as a tip of touch instrument 102. When force 120 is applied to the tip of touch instrument 102, the tip may be pressed against sensor portion 124 and indicia of the force applied may be provided to communication manager 108 (also shown as communication manager 208 in FIG. 2). Force detector 210 may be configured to determine or quantify the force applied at the tip based on the indicia from sensor portion 124. A lack of applied force may indicate a touch instrument is in hover mode.

In step 504, one or more communication signals may be received from a touch device by one or more antennas of touch instrument. For example, communication signals may be transmitted by antennas of digitizer 106 (shown in FIG. 1B and FIG. 3) and received by one or more antennas, such as antenna 126a, antenna 126c, and/or antenna 126g (shown in FIG. 1C and FIG. 3). Antenna/transceiver logic 222 and/or interface 226 may be configured to receive indicia of the received communication signals and provide related information/data to orientation detector 212. Antenna/transceiver logic 222 may be configured to determine respective energies of the communication signals received at each of the antennas based on the information/data, according to embodiments. Communication signals may comprise different types of signals and protocols as discussed in further detail below.

In step 506, an orientation of a touch instrument with respect to a touch device may be determined, for example, based on energy(ies) of the communication signals. For example, orientation detector 212 may be configured to determine an orientation of touch instrument 102 based on information associated with the received communication signals of step 504 above. In an example, orientation detector 212 may be configured to determine the orientation, for example, by determining the energies of the received signals at each antenna based on the indicia or information/data in step 504, or may be configured to receive an indication of the energies determined by antenna/transceiver logic 222 from step 504, and determine the orientation based on the indication of the energies. Energies for a communication signal received by an antenna may differ, for example, based on the angle of touch instrument 102 with respect to touch device 104 and digitizer 106. Orientation detector 212 may determine an orientation of touch instrument 102, for example, based on the differences in energies in conjunction with known positions and orientations of the antennas in touch instrument 102, which may be stored in Lookup Table(s) 224. Energies vary based on antenna capacitance values for different orientations of touch instrument 202 with respect to antennas of a touch device's digitizer. Determined combinations of communication signal energies may be determined to correspond to specific orientations of a touch instrument. Additional examples regarding orientation determinations are discussed in further detail below.

In step 508, a distance between a touch device and a touch instrument may be determined, for example, based on the orientation and one or more communication signals from the touch device received by the one or more antennas. For example, distance detector 214 may be configured to determine a distance between touch instrument 102 (e.g., at the tip and/or the end ("tail") where antenna 126g may be located) and touch device 104. Distance detector 214 may be configured to determine the distance based (e.g., at least) on the orientation of touch instrument 102 determined in step 506 by orientation detector 212 and the energies of the received communication signals in either of step 504 or step 506.

Distances may be determined, for example, based on orientation and energies in embodiments to differentiate scenarios in which the same energy at an antenna may correspond to different distances due to antenna capacitance in different orientations, as described in further detail below. Distance detector 214 may determine the distance corresponding to the orientation and the energies of the received communication signals.

In step 510, proximity information (e.g., distance, force, orientation) may be provided to communication manager 208 (e.g., transmission manager 218, inking manager 216). In an example, proximity information/data may be stored (e.g., buffered, such as in memories/storage 206) for access by communication manager 208, for example, for processing by inking manager 216 and transmission manager 218.

From step 510, flowchart 500 may return to step 502 or step 504, for example, and repeat the steps described above to provide continuous or periodic updates of proximity information to the touch device.

In an example, a distance determination may override a force determination to distinguish hover and touch modes and for inking commands.

Figure 6:
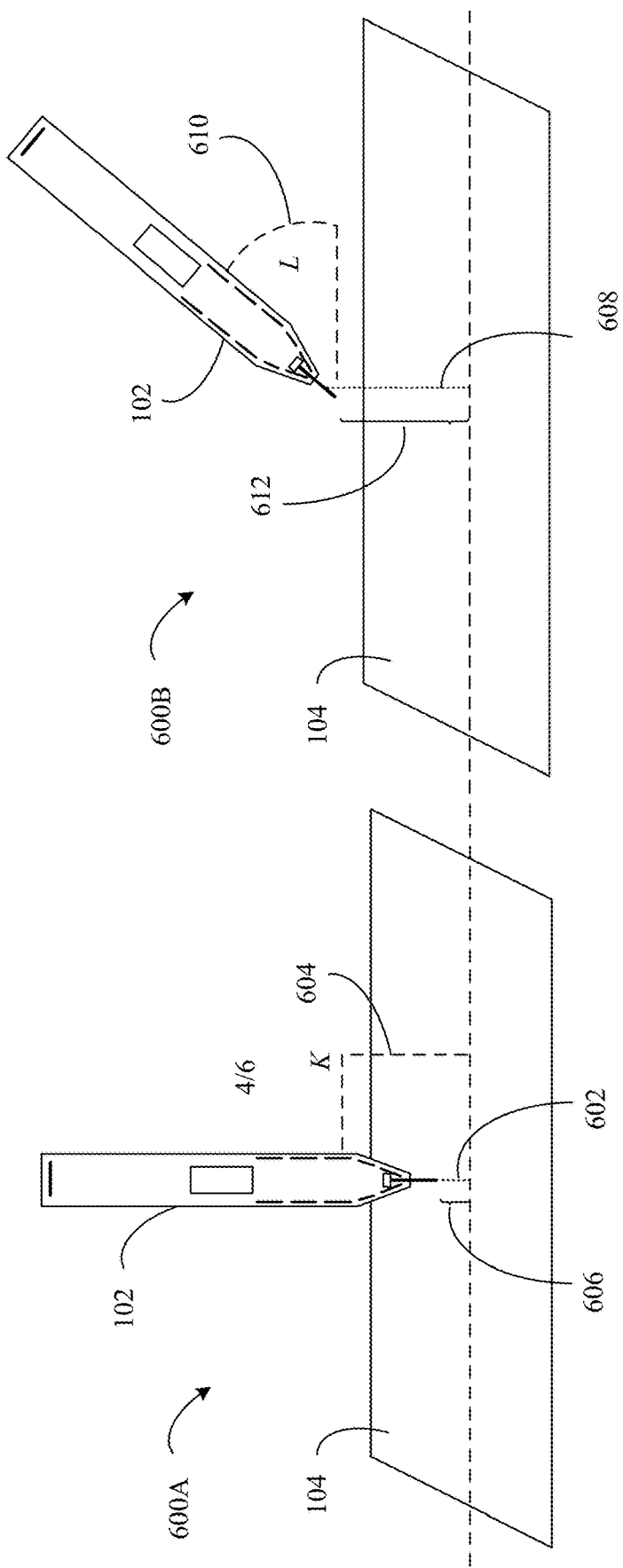
FIGS. 6A and 6B show diagrams of orientations and signal energy received for adaptive hover operation of touch instruments, in accordance with example embodiments.

FIGS. 6A and 6B show diagrams of orientations and signal energy by a touch instrument, in accordance with example embodiments. FIGS. 6A and 6B respectively show diagrams of an orientation 600A and an orientation 600B with signal energies received by touch instrument 102. Orientation 600A and orientation 600B illustrate two example orientations of touch instrument 102 with respect to touch device 104.

In orientation 600A, instrument 102 is held at an angle K 604 above the plane of touch device 104. Angle K 604 is exemplary shown as a 90 degree angle such that touch instrument 102 is perpendicular to touch device 104. Touch instrument 102 hovers above touch device 104 at a distance 606, and a first energy of a communication signal 602 may be detected by an antenna(s) of touch instrument 102.

In orientation 600B, instrument 102 is held at an angle L 610 above the plane of touch device 104. Angle L 610 is exemplary shown as an angle that is less than 90 degrees, e.g., an angle of 60 degrees, 45 degrees, 30 degrees, etc., such that touch instrument 102 is not perpendicular to touch device 104. Touch instrument 102 hovers above touch device 104 at a distance 612, and a second energy of a communication signal 608 may be detected by an antenna(s) of touch instrument 102.

While writing/inking, a user may lift touch instrument 102 to a distance away from touch device 104. Distances may be realized as a few millimeters or less. Distance extractions based on communication signal energies may be accurate (e.g., at or less than 1 mm). Distance calculations and tilt angle determinations for an orientation of touch instrument 102 may be calculated accurately.

Different combinations of orientation and distance may provide for the same value of received signal energy. In an example, orientation 600A (showing a distance 606 and the value of angle K 604 with communication signal 602 received with a first energy at the tip of touch instrument 102) may result in the same energy value as orientation B (showing distance 612 and the value of angle L 610 with communication signal 608 received with a second energy). A reason that combinations of orientation and distance may provide for the same value of received signal energy may be that a signal is a function of the capacitance between touch instrument 102 to touch device 104, and capacitance is function of area and distance. A touch instrument that is tilted to a non-perpendicular orientation may expose more area of antenna (e.g., in the tip) to a touch device screen than a touch instrument at a 90 degree angle. In other words, in a tilt angle orientation range of zero to 90 degrees, smaller angles correspond to greater energies received. Thus, detecting signals at multiple antennas in a touch device may be more accurate to determine distances for adaptive hover operation of touch instruments.

Embodiments may utilize two or more antennas in touch instruments for distance and orientation determinations. In an example, tilt angle for an orientation of a touch instrument may be determined based on energies of a communication signal received by antennas of a touch instrument. Distance may be determined based on orientation and energies, for example, as described by examples in FIG. 7 and FIG. 8.

Figure 7:
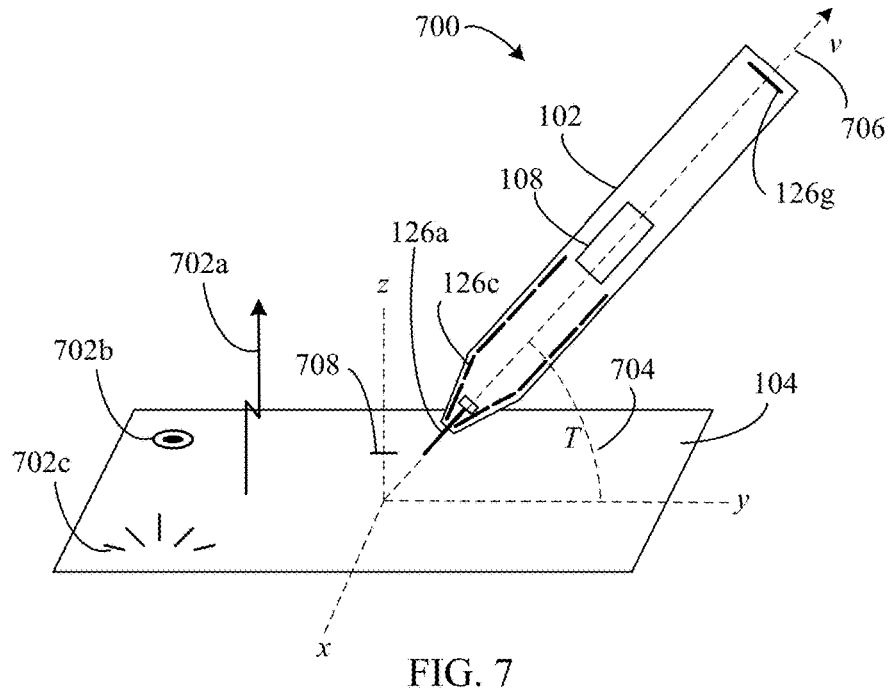
FIG. 7 shows a diagram of a system for distance calculation based on orientation and signal energy received for adaptive hover operation of touch instruments, in accordance with an example embodiment.

FIG. 7 shows a diagram of a system 700 for distance calculation based on orientation and signal energy received by a touch instrument, in accordance with an example embodiment. Example operation of example system 700 is presented with reference to example method 800 shown in FIG. 8.

Figure 8:
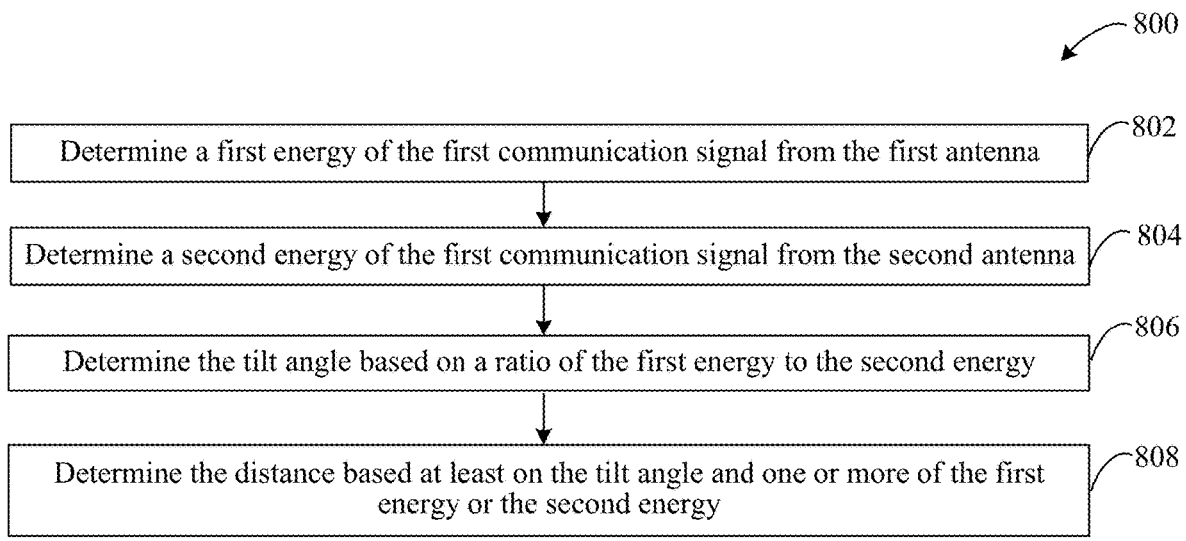
FIG. 8 shows example flowchart for determining distance and orientation information for adaptive hover operation of touch instruments, according to an example embodiment.

FIG. 8 shows example flowchart of a method 800 for determining distance and orientation information for adaptive hover operation of touch instruments, according to an example embodiment. Embodiments disclosed herein and other embodiments may operate in accordance with example method 800. For example, touch instrument 102/202, communication manager 108/208 and proximity detector 209 may operate according to example method 800. Method 800 comprises steps 802-808. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

Example system 700 may comprise touch instrument 102 (e.g., with communication manager 108/208, antennas 126a-126g) and touch device 104. In an example, touch instrument 102 may have an orientation with respect to touch device 104, denoted by x-y-z axes, where the x-y plane corresponds to the surface of plane of touch device 104 (and digitizer 106), and the z-axis corresponds to the distance between touch instrument 102 and touch device 104.

As shown, the orientation of touch instrument 102 may include a tilt angle T 704 between the x-y axis plane and a vector v 706 corresponding to touch instrument 102. Likewise, touch instrument 102 may be held at a distance 708 from touch device 104, where distance 704 may be zero millimeters or more.

Referring again to FIG. 8, method 800 begins at step 802. In step 802, a first energy of the first communication signal from the first antenna is determined. For example, antenna/transceiver logic, e.g., as described above for communication manager 208 or proximity detector 209, may be configured to determine the first energy of the first communication signal from touch device 104 received by a first antenna of touch instrument 102. In an example, antenna 126a, antenna 126c, antenna 126g or another antenna may be the first antenna. The energy determined in step 802 (e.g., the first energy) may correspond to tilt angle T 704 due to antenna capacitance, as described herein.

The first communication signal may be of any signal type/protocol. For example, a signal 702a may be signal utilized for information exchange between touch instrument 102 and the digitizer of touch device 104. A signal 702b may be a touch sensing signal for touch determinations between touch instrument 102 and touch device 104. In an example, a cycle of a touch instrument may be synchronized with a cycle of a digitizer of the touch device, for example, so the touch instrument knows the touch signal positions in the cycle. A signal 702c may be a display signal for content on a screen of touch device 104 used for touch sensing that may be detected and received by antennas of touch instrument 102. In an example, any of signal 702a, signal 702b, or signal 702c may correspond to the first communication signal.

In step 804, a second energy of the first communication signal from the second antenna may be determined. For example, antenna/transceiver logic, e.g., as described above for communication manager 208, may be configured to determine the second energy of the first communication signal from touch device 104 received by a second antenna of touch instrument 102. In an example, antenna 126a, antenna 126c, antenna 126g or another antenna may be the second antenna. The energy determined in step 802 (e.g., the second energy) may correspond to tilt angle T 704 due to antenna capacitance, as described herein.

In step 806, the tilt angle may be determined based on a ratio of the first energy to the second energy. For example, the first energy determined in step 802 and the second energy determined in step 804 may be compared, e.g., as a ratio, by orientation detector 212. The ratio determined may be compared against a lookup table, e.g., lookup table 224, or other data structure having stored therein one or more entries with ratios of energies for different antenna combinations that correspond to tilt angle T 704 of the orientation for touch instrument 102. In an example, an orientation detector may be configured to dynamically calculate tilt angle T 704 using mathematical relationships of the relative locational relationships between the antennas and the ratio of energies. In an example, lookup table 224 may be updated with the determined angle and the ratio. Tilt angle T 704 may be determined or confirmed using an accelerometer (not shown) of touch instrument 102. Example implementations may use a receiver/transmitter per antenna. $E_{tip}$ may be an energy received in the tip while $E_{tilt}$ and $E_{tail}$ may be respective energies for the tilt antenna and tail antenna. A pen tilt angle with respect to the screen may be extracted, for example, using the ratio between $E_{tip}$ and $E_{tail}$, e.g., $\theta$=function ($E_{tip}$, $E_{tilt}$). In an example for pen height above a screen, the received energy $E_{tip}$, $E_{tilt}$ may be function of the height and the tilt angle $\delta$, and h=function ($E_{tip}$, $E_{tilt}$, $E_{tail}$, $\theta$). In an example, finite element simulations of electrostatic fields for specific geometries in different heights/distances and angles may be used to verify relationships by measuring the signals while holding the pen at different angles and heights.

In step 808, the distance may be determined, for example, based on the tilt angle and one or more of the first energy or the second energy. For example, tilt angle T 704 determined in step 806 and at least one of the first energy or the second energy determined in step 802 and step 804, respectively, may be utilized, e.g., by proximity detector 209 to determine distance 708 between touch instrument 102 and touch device 104. The orientation, e.g., tilt angle T 704, and one or more of the first or second energies may be compared against a lookup table, e.g., lookup table 224, or other data structure having stored therein one or more entries with distances corresponding to the orientation and energy(ies) for touch instrument 102. In an example, a proximity detector may be configured to dynamically calculate distance 708 using mathematical relationships of the relative locational relationships between the antennas, the orientation, and the of energy(ies). In an example, lookup table 224 may be updated with the determined distance and the corresponding orientation and energy(ies).

Flowchart 800 may be expanded to include one or more additional steps, for example, when three or more antennas may be used to determine distance 708, which may increase an accuracy of a distance determination.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

Embodiments described with respect to FIGS. 1-8, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 9:
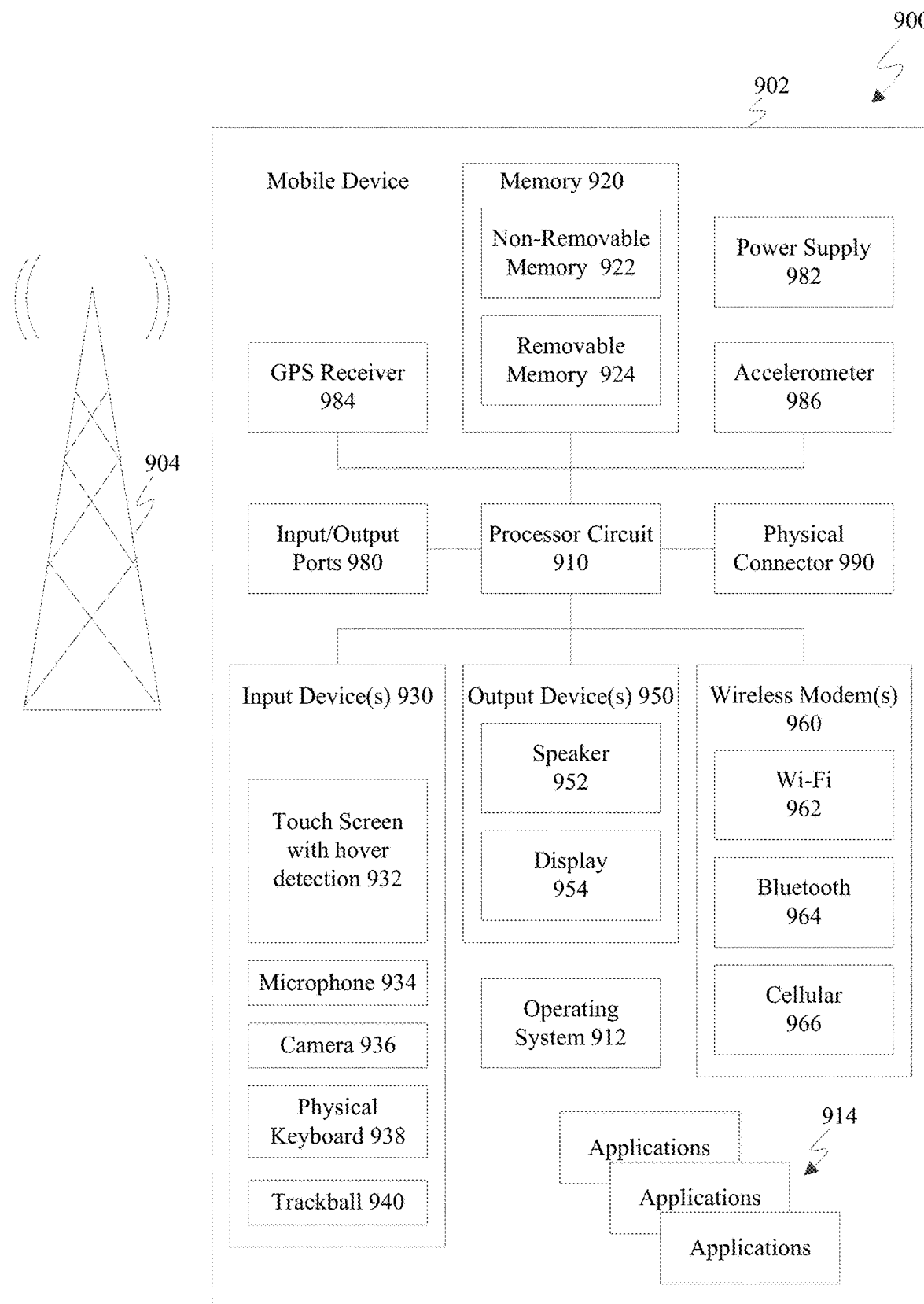
FIG. 9 shows a block diagram of an example mobile device that may be used to implement various example embodiments.

FIG. 9 is a block diagram of an exemplary mobile system 900 that includes a mobile device 902 that may implement embodiments described herein. For example, mobile device 902 may be used to implement any applicable system, client, or device, or components/subcomponents thereof, in the preceding sections, such as touch device 104 or ML host 112. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100A of FIG. 1A, system 100B of FIG. 1B, system 100C of FIG. 1C, and system 200 of FIG. 2, and system 700 of FIG. 7, along with any components and/or subcomponents thereof, as well as the flowcharts/flow diagrams described herein, including portions thereof, and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

Figure 10:
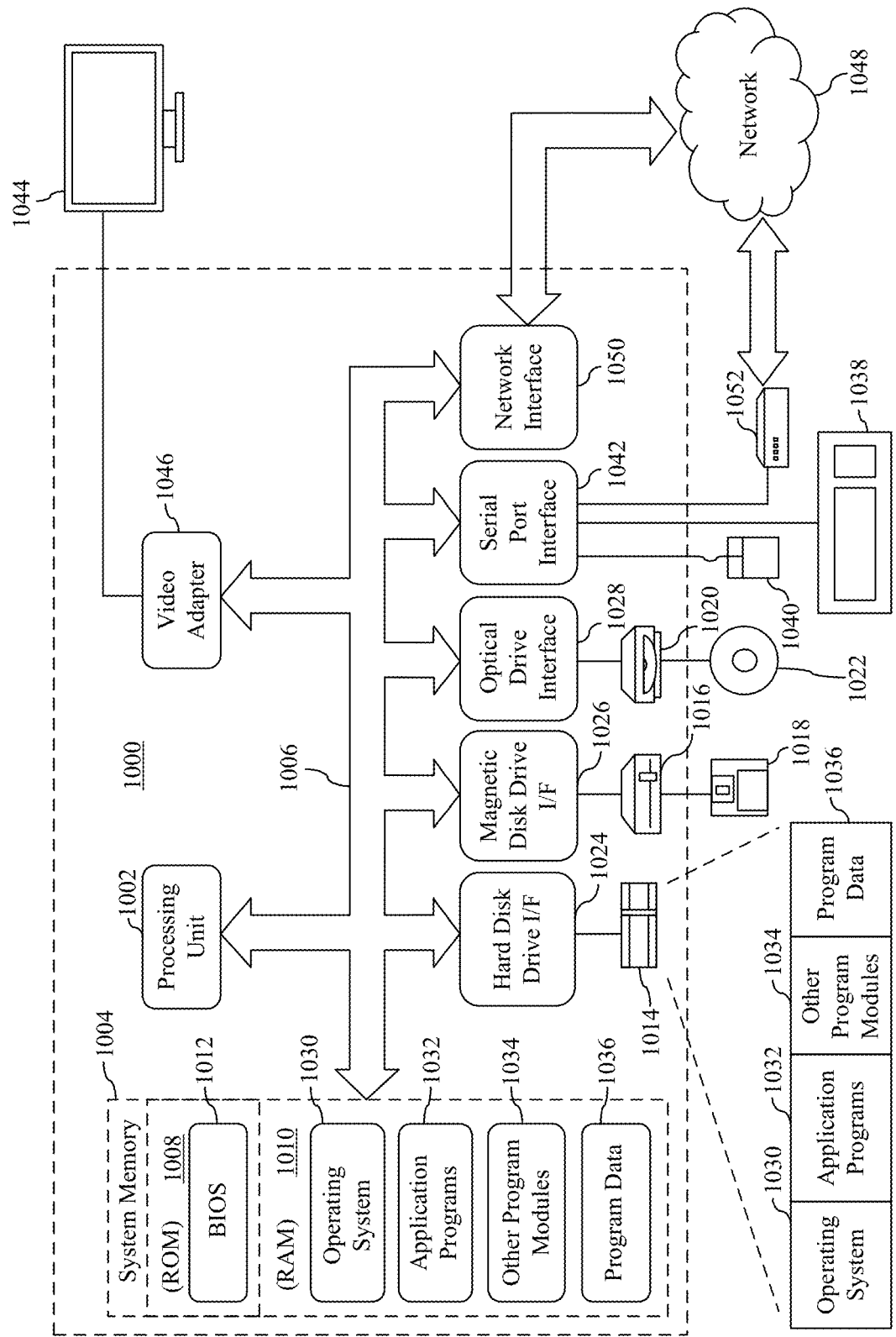
FIG. 10 shows a block diagram of an example computing device that may be used to implement embodiments.

FIG. 10 depicts an exemplary implementation of a computing device 1000 in which embodiments may be implemented. For example, embodiments described herein, such as touch device 104 or ML host 112, may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as system 100A of FIG. 1A, system 100B of FIG. 1B, system 100C of FIG. 1C, and system 200 of FIG. 2, and system 700 of FIG. 7, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nano-technology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of touch instruments, e.g., a touch pen, stylus, etc., and touch inputs via touch interfaces, the embodiments herein are not so limited and may also be applied through other input devices.

The additional examples and embodiments described in this Section may be applicable to examples disclosed in any other Section or subsection of this disclosure.

Methods, devices, systems, and computer program products are provided for adaptive hover operation of touch instruments, which may increase (e.g., triple or quadruple) hover height and improve user experience. Hover range may be adapted (e.g., varied), for example, by adapting an antenna configuration during hover. A touch instrument may comprise multiple antennas that may be activated and deactivated, e.g., as a function of proximity Antenna configuration may increment (e.g., increase cumulative antenna size) as hover height increases and decrement (e.g., decrease cumulative antenna size) as hover height decreases. Antennas may be multi-purpose, e.g., used to maintain synchronization for extended hover range and for other purposes (e.g., determining hover height, tilt, orientation, grip) and/or features (e.g., providing commands for pop-up menus). Adaptive hover may support (i) maintaining synchronization during use, (ii) faster synchronization when a touch instrument enters or re-enters detectable hover height, (iii) improved palm rejection and (iv) pop up menu presentation.

In an example, a touch instrument configured to operate with a touch device may comprise, for example, a first antenna; a second antenna; and an adaptive transmitter configured to adapt a hover range of the touch instrument based on a proximity of the touch instrument to the touch device by: driving a first signal on the first antenna when the proximity is in a first proximity range; and driving a second signal on the second antenna when the proximity is in a second proximity range.

In an example, the touch instrument may comprise, for example, a proximity detector configured to determine the proximity of the touch instrument to the touch device.

In an example, the proximity detector comprises a force detector configured to detect a force indicating whether the touch instrument is in a touch mode or a hover mode; and wherein the transmission manager is further configured to drive the second signal on the second antenna based on a detected hover mode, and drive the second signal on the second antenna based on a detected touch mode.

In an example, the proximity detector comprises a distance detector configured to determine a hover height of the touch instrument relative to the touch device; and wherein the transmission manager is configured to drive the second signal on the second antenna based on a hover height threshold.

In an example, the first proximity range includes a touch proximity or a hover height of zero and the second proximity range excludes the touch proximity or the hover height of zero.

In an example, the first proximity range overlaps with the second proximity range such that the transmission manager is configured to drive the first signal on the first antenna and the second signal on the second antenna concurrently in the overlapping range.

In an example, the first signal and the second signal comprise the same signal.

In an example, the transmission manager is configured to reduce a frequency of first and second signals to reduce power consumption during the concurrent transmission.

In an example, the touch instrument further comprises: a third antenna; and wherein the transmission manager is further configured to adapt the hover range by: driving a third signal on the third antenna when the determined proximity is in a third proximity range.

In an example, the first antenna comprises a tip antenna, the second antenna comprises at least a portion of a tip enclosure of the touch instrument, and the third antenna comprises at least one of at least a portion of the tip enclosure of the touch instrument or at least a portion of a barrel enclosure of the touch instrument.

In an example, the second antenna is a multi-purpose antenna configured to increase a hover range of the touch instrument and to determine at least one of a tilt or orientation of the touch instrument, a proximity of the touch instrument to the touch device, and a user grip of the touch instrument.

In another example, a method comprises: detecting a proximity of a touch instrument to a touch device; adapting a hover range of the touch instrument based on the proximity by: selecting a hover transmission configuration comprising at least one of a first antenna and a second antenna; driving a first signal on the first antenna when the detected proximity is in a first proximity range; and driving a second signal on the second antenna when the detected proximity is in a second proximity range.

In an example, the first proximity range includes a touch proximity or a hover height of zero and the second proximity range excludes the touch proximity or the hover height of zero.

In an example, the first proximity range overlaps with the second proximity range such that the transmission manager is configured to drive the first signal on the first antenna and the second signal on the second antenna concurrently in the overlapping range.

In an example, the first signal and the second signal comprise the same signal.

In an example, the method further comprises: using the second antenna to detect at least one of the proximity of the touch instrument to the touch device, and an orientation of the touch instrument.

In another example, a computer-readable storage medium having program instructions recorded thereon that, when executed by a processing circuit of a touch instrument, perform a method comprising: adapting a hover range of the touch instrument based on a proximity of the touch instrument to a touch device by: selecting a hover transmission configuration comprising at least one of a first antenna and a second antenna; driving a signal on the first antenna when the proximity is in a first proximity range; and driving the signal on the second antenna when the proximity is in a second proximity range.

In an example, the first antenna comprises a tip antenna and the second antenna comprises at least a portion of a tip enclosure of the touch instrument.

In an example, the first proximity range includes a touch proximity or a hover height of zero and the second proximity range excludes the touch proximity or the hover height of zero.

In an example, the first proximity range overlaps with the second proximity range so that the first signal is driven on the first antenna and the second signal is driven on the second antenna concurrently in the overlapping range.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A touch instrument configured to operate with a touch device, the touch instrument comprising:
   a first antenna;
   a second antenna; and
   a transmission manager configured to adapt a hover range of the touch instrument based on a proximity of the touch instrument to the touch device by:
      driving a first signal on the first antenna when the proximity is in a first proximity range; and
      driving a second signal on the second antenna when the proximity is in a second proximity range, the first proximity range overlapping with the second proximity range such that the transmission manager is configured to drive the first signal on the first antenna and the second signal on the second antenna concurrently in the overlapping range.

2. The touch instrument of claim 1, further comprising:
   a proximity detector configured to determine the proximity of the touch instrument to the touch device.

3. The touch instrument of claim 2,
   wherein the proximity detector comprises a force detector configured to detect a force indicating whether the touch instrument is in a touch mode or a hover mode; and
   wherein the transmission manager is further configured to
      drive the second signal on the second antenna based on a detected hover mode, and
      drive the second signal on the second antenna based on a detected touch mode.

4. The touch instrument of claim 2,
   wherein the proximity detector comprises a distance detector configured to determine a hover height of the touch instrument relative to the touch device; and
   wherein the transmission manager is configured to drive the second signal on the second antenna based on a hover height threshold.

5. The touch instrument of claim 4, wherein the first proximity range includes a touch proximity or a hover height of zero and the second proximity range excludes the touch proximity or the hover height of zero.

6. The touch instrument of claim 1, wherein the first signal and the second signal comprise the same signal.

7. The touch instrument of claim 6, wherein the transmission manager is configured to reduce a frequency of first and second signals to reduce power consumption during the concurrent driving of the first signal and the second signal.

8. The touch instrument of claim 1, further comprising:
   a third antenna; and
   wherein the transmission manager is further configured to adapt the hover range by:
      driving a third signal on the third antenna when the determined proximity is in a third proximity range.

9. The touch instrument of claim 8, wherein
   the first antenna comprises a tip antenna,
   the second antenna comprises at least a portion of a tip enclosure of the touch instrument, and
   the third antenna comprises at least one of
      at least a portion of the tip enclosure of the touch instrument or
      at least a portion of a barrel enclosure of the touch instrument.

10. The touch instrument of claim 8, wherein the second antenna is a multi-purpose antenna configured to increase a hover range of the touch instrument and to determine at least one of a tilt or orientation of the touch instrument, a proximity of the touch instrument to the touch device, and a user grip of the touch instrument.

11. A method comprising:
    detecting a proximity of a touch instrument to a touch device;
    adapting a hover range of the touch instrument based on the proximity by:
       selecting a hover transmission configuration comprising at least one of a first antenna and a second antenna;
       driving a first signal on the first antenna when the detected proximity is in a first proximity range; and
       driving a second signal on the second antenna when the detected proximity is in a second proximity range, the first proximity range overlapping with the second proximity range such that the driving the first signal on the first antenna is concurrent with the driving the second signal on the second antenna in the overlapping range.

12. The method of claim 11, wherein the first proximity range includes a touch proximity or a hover height of zero and the second proximity range excludes the touch proximity or the hover height of zero.

13. The method of claim 11, wherein the first signal and the second signal comprise the same signal.

14. The method of claim 11, further comprising:
    using the second antenna to detect at least one of the proximity of the touch instrument to the touch device, and an orientation of the touch instrument.

15. The method of claim 11, further comprising:
    detecting a force indicating whether the touch instrument is in a touch mode or a hover mode; and
    driving the second signal on the second antenna based on a detected hover mode or a detected touch mode.

16. The method of claim 11, further comprising:
determining a hover height of the touch instrument relative to the touch device; and
driving the second signal on the second antenna based on a hover height threshold.

17. A computer-readable storage medium having program instructions recorded thereon that, when executed by a processing circuit of a touch instrument, perform a method comprising:
adapting a hover range of the touch instrument based on a proximity of the touch instrument to a touch device by:
selecting a hover transmission configuration comprising at least one of a first antenna and a second antenna;
driving a signal on the first antenna when the proximity is in a first proximity range; and
driving the signal on the second antenna when the proximity is in a second proximity range, the first proximity range overlapping with the second proximity range such that the driving the first signal on the first antenna is concurrent with the driving the second signal on the second antenna in the overlapping range.

18. The computer-readable storage medium of claim 17, wherein the first antenna comprises a tip antenna and the second antenna comprises at least a portion of a tip enclosure of the touch instrument.

19. The computer-readable storage medium of claim of claim 18, wherein the first proximity range includes a touch proximity or a hover height of zero and the second proximity range excludes the touch proximity or the hover height of zero.

20. The computer-readable storage medium of claim 17, wherein the first signal and the second signal comprise the same signal.

* * * * *